United States Patent [19]

Edelstein et al.

[11] Patent Number: 4,976,754
[45] Date of Patent: Dec. 11, 1990

[54] LIQUID LINE NON-CONDENSIBLE GAS TRAP

[75] Inventors: Fred Edelstein, Hauppauge; Maria Liandris, Long Island City; Richard F. Brown, Hauppauge, all of N.Y.

[73] Assignee: Grumman Aerospace Corporation, Bethpage, N.Y.

[21] Appl. No.: 446,355

[22] Filed: Dec. 5, 1989

[51] Int. Cl.⁵ .............................................. B01D 19/00
[52] U.S. Cl. ...................................... 55/159; 55/160; 55/210
[58] Field of Search ...................... 55/18, 36, 159, 160, 55/210

[56] References Cited

U.S. PATENT DOCUMENTS

| | | | |
|---|---|---|---|
| 2,784,677 | 3/1957 | Reichertz et al. | 55/160 |
| 2,917,110 | 12/1959 | Brohl | 55/159 |
| 3,775,947 | 12/1973 | Dupont et al. | 55/159 |
| 3,854,907 | 12/1974 | Rising | 55/159 |
| 4,276,170 | 6/1981 | Vaillancourt | 55/159 |
| 4,330,306 | 5/1982 | Salant | 55/159 |

Primary Examiner—Jay H. Woo
Assistant Examiner—C. Scott Bushey
Attorney, Agent, or Firm—Pollock, Vande Sande & Priddy

[57] ABSTRACT

An in-line, non-condensible gas trap for a liquid line which includes an interior mesh tube through which fluid can flow to a trap outlet. Non-condensible gas is trapped outwardly of the mesh tube due to capillary action and periodically the collected gas is vented thereby ridding the liquid line of the non-condensible gas. The present trap operates well in outer space environments (zero gravity) as well as normal ambient conditions (1 g).

4 Claims, 1 Drawing Sheet

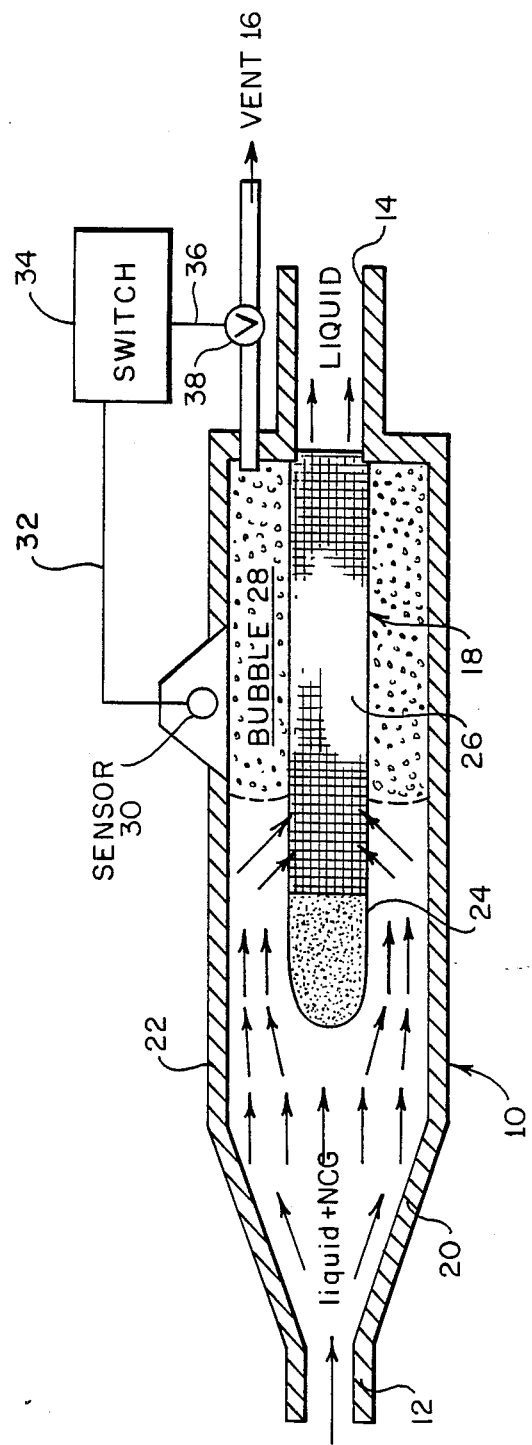

LIQUID LINE NON-CONDENSIBLE GAS TRAP

FIELD OF THE INVENTION

The present invention relates to liquid line gas traps, and more particularly to an in-line gas trap for venting non-condensible gases dissolved in transported liquids.

BACKGROUND OF THE INVENTION

In many types of heating/cooling systems, volatile liquids are circulated in a closed loop. With changes in temperature and aging of a system, originally dissolved gases in the working liquid may come out of solution and will occlude the delivery tubes. This forces pumps to work harder and may create uneven heating or cooling. In many situations the gas continues to expand so that the build-up of bubbles continues without correction until the system fails.

BRIEF DESCRIPTION OF THE INVENTION

The present invention mechanically separates non-condensible gas from a circulating liquid and enables venting of the gas while maintaining a closed pressurized loop for circulation of a liquid. The invention is a liquid line gas trap which incorporates an axially disposed mesh tube through which incoming liquid can pass. Small bubbles of the non-condensible gas are prevented, by capillary action, from passing through the mesh tube. Accordingly, the small bubbles merge and form a larger bubble along the outside of the mesh tube.

By ultrasonically sensing the bubble build-up, a point is reached where a substantial length of the mesh tube is covered by the growing bubble. At this point, a vent is actuated to allow the gas to escape while ensuring that all of the liquid is retained within the supply line.

BRIEF DESCRIPTION OF THE FIGURE

The above-mentioned objects and advantages of the present invention will be more clearly understood when considered in conjunction with the accompanying drawing, in which:

the figure is a diagrammatic cross-sectional view of the present liquid line gas trap.

DETAILED DESCRIPTION OF THE INVENTION

The figure generally illustrates the in-line gas trap of the present invention, indicated by reference numeral 10. The trap inlet 12 provides an entry point for liquid containing non-condensible gas (NCG). The purpose of the trap is to separate the gas from the liquid itself so that gas-free liquid can be delivered to outlet 14 while a vent 16 permits the previously trapped non-condensible gas to escape. The mechanical separation of gas from liquid is achieved by a wire mesh tube generally indicated by reference numeral 18 and axially disposed along the trap housing.

The inlet of the trap housing expands conically outwardly, along section 20, to an enlarged cylindrical elongated section 22. The wire mesh tube 18 is axially disposed along the length of the section 22. The wire mesh tube 18 includes a solid bullet-shaped nose section 24 for smoothly diverting the flow of liquid through the annular space defined between the outer diameter of the wire mesh tube 18 and the inner wall of trap section 22. Nose section 24 continues rearwardly to a wire mesh section 26 through which the liquid may pass radially inwardly for passage to the liquid outlet 14. Circulation through the trap is ensured by an in-line pump (not shown).

Due to capillary action the non-condensible gas bubbles present in the liquid will not penetrate the mesh and will instead remain in the annular space between the mesh and the inner wall of the trap section 22. As the liquid flows between inlet and outlet, bubbles will merge to form an increasingly greater bubble 28 in the annular volume. A sensor 30, such as a conventional ultrasonic sensor, is mounted along the section 22; and as the growing bubble displaces liquid in the area of the sensor, the change causes activation of the sensor 30. A signal is thus sent along lead 32 to a switch 34. This switch is connected via lead 36 to a valve 38, the latter selectively opening the vent 16 so that the non-condensible gas of bubble 28 may be vented. The switch 34 may be a relay which opens valve 38 for a preselected period sufficient to expel the gas bubble 28. It would not be advantageous to have a longer timing interval for switch 34 since a certain amount of liquid would be lost in the vent and this is undesirable.

The construction of the present invention will work very well in outer space (zero gravity environment). Due to the lack of gravity in space, most gas traps, depending upon gravitational feed of liquid, do not work well in space. Advantageously, although the present invention operates well in a zero gravity environment, it will also operate well in a normal atmospheric environment (1 g).

It should be understood that the invention is not limited to the exact details of construction shown and described herein for obvious modifications will occur to persons skilled in the art.

We claim:

1. A liquid line trap for non-condensible gases comprising:
    a generally cylindrical member having an inlet at one end and outlet at a second end;
    a mesh tube axially positioned within the member and secured to the second end, over the outlet, leaving an annular space between the entire tube length and the member through which liquid, filling the entire space, can flow radially inwards to the outlet, capillary action of the mesh tube trapping non-condensible gas within the annular space;
    sensing means located along the cylindrical member for sensing a preselected accumulation of non-condensible gas in the annular space; and
    timed valve means connected to the cylindrical member for venting the preselected accumulated gas from the trap thus ridding the liquid of the gas without liquid loss.

2. The structure set forth in claim 1 wherein the mesh tube includes a solid bullet-shaped nose for smoothly directing the liquid flow through the trap.

3. The structure set forth in claim 1 wherein the sensing means comprises an ultrasonic sensor.

4. The structure set forth in claim 1 wherein the inlet tapers conically outwards for directing the liquid flow to the annular space.

* * * * *